United States Patent [19]

Fahey

[11] 3,925,286
[45] Dec. 9, 1975

[54] SIZING, COATING AND COMBINED SIZING AND COATING COMPOSITION FOR GLASS FIBERS

[75] Inventor: Dennis M. Fahey, Aspinwall, Pa.

[73] Assignee: PPG Industries, Inc., Pittsburgh, Pa.

[22] Filed: Dec. 14, 1973

[21] Appl. No.: 425,032

Related U.S. Application Data

[60] Continuation of Ser. No. 292,576, Sept. 27, 1972, which is a division of Ser. No. 93,980, Dec. 1, 1970, Pat. No. 3,718,449.

[52] U.S. Cl. ... 260/29.3; 117/126 GB; 117/126 GN; 260/33.4 R; 260/844; 260/846; 260/847
[51] Int. Cl.$^2$........................................ C08L 61/06
[58] Field of Search............ 260/29.3, 33.4 R, 884, 260/846, 847; 117/126 GB, 126 GS, 126 GN

[56] References Cited
UNITED STATES PATENTS

| | | | |
|---|---|---|---|
| 2,724,078 | 11/1955 | Durst et al. | 260/33.4R |
| 2,728,737 | 12/1955 | Wittcoff | 260/33.4 R |
| 3,449,280 | 6/1969 | Frigstad | 260/29.3 |
| 3,554,936 | 1/1971 | Braude et al. | 260/29.4 UA |
| 3,556,754 | 1/1971 | Marsden et al. | 260/29.3 |

Primary Examiner—Lorenzo B. Hayes
Attorney, Agent, or Firm—Robert DeMajistre

[57] ABSTRACT

Individual glass fibers are coated with a combined sizing and coating composition that includes furfuryl alcohol as a constituent. The preferred combined sizing and coating composition comprises an aqueous mixture including furfuryl alcohol, ammonia, an elastomeric latex selected from natural and synthetic rubber latices such as neoprene, isoprene, butyl rubber, butadiene-styrene copolymers, acrylonitrile-butadienestyrene terpolymers, styrene-butadiene-vinylpyridine terpolymers, and the like, an aminosilane coupling agent such as gammaaminopropyltriethoxysilane, and a resorcinol-formaldehyde resin. An aqueous solution of the combined sizing and coating composition is prepared and the individual glass fibers are coated shortly after attenuation with this combined sizing and coating composition. The coated individual glass fibers are thereafter gathered into strands and the strands are dried while spaced from each other. The dried strands are thereafter collected on a forming tube and are used as a glass fiber reinforcement for elastomeric products. The furfuryl alcohol may also be used as a constituent in a sizing composition that includes a coupling agent and also, in a coating composition, for use with glass fibers that have been previously coated with a separate sizing composition.

2 Claims, 3 Drawing Figures

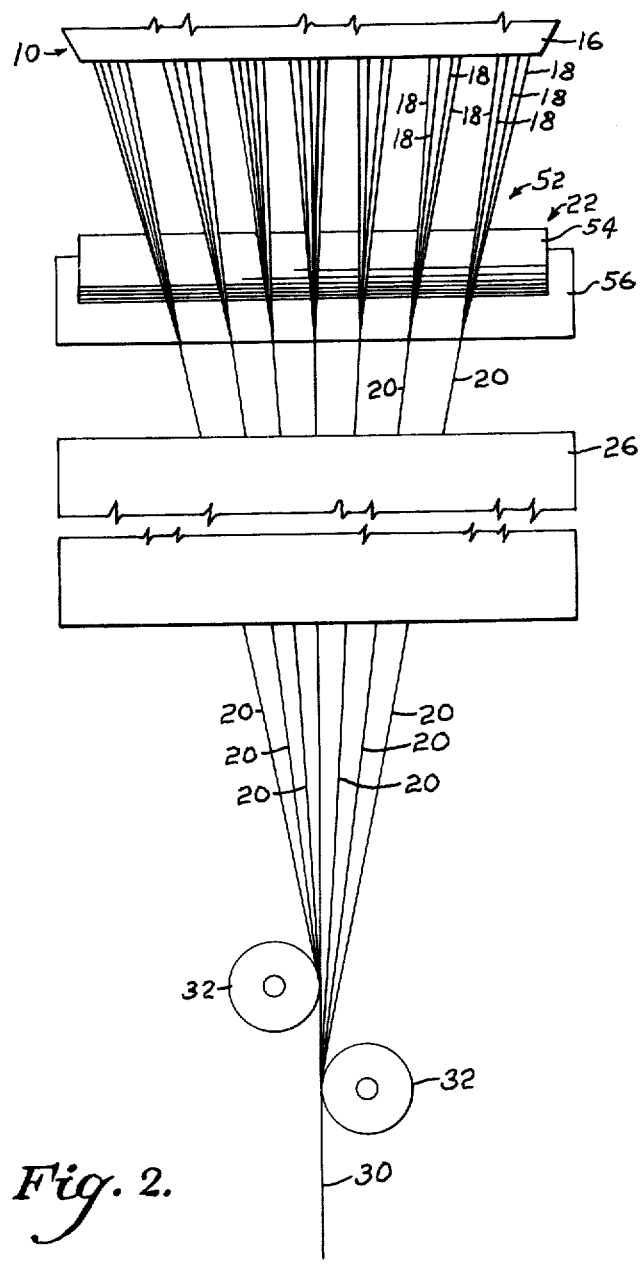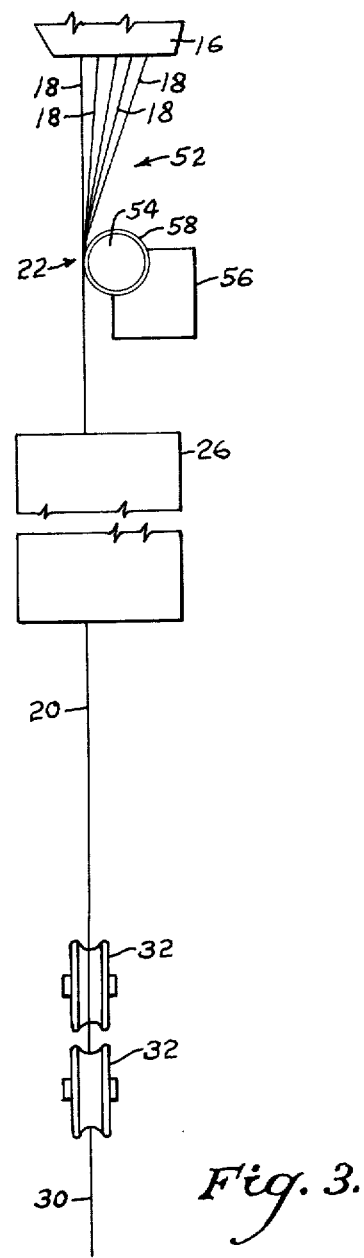
Fig. 2.
Fig. 3.

SIZING, COATING AND COMBINED SIZING AND COATING COMPOSITION FOR GLASS FIBERS

CROSS-REFERENCE TO RELATED APPLICATIONS

This application is a continuation of application Ser. No. 292,576, filed Sept. 27, 2972, which is a division of application Ser. No. 93,980, filed Dec. 1, 1970, now U.S. Pat. No. 3,718,449.

BACKGROUND OF THE INVENTION

1. Field of the Invention

This invention relates to a sizing, coating and combined sizing and coating composition for glass fibers and more particularly to an aqueous sizing, coating and combined sizing and coating composition that includes furfuryl alcohol for coating glass fibers for use in reinforcing elastomeric products.

2. Description of the Prior Art

It has long been recognized that glass fiber should make an ideal reinforcement for automobile tires (U.S. Pat. No. 2,184,326), rubber timing belts (U.S. Pat. No. 2,135,057) and other rubber or rubber-like materials. In preparing glass fibers for such applications, glass fibers in the form of strands, yarn, roving or fabric are coated with an adhesive to aid in bonding of the glass to the elastomeric material. By far the most widely used adhesive for preparing glass fibers for reinforcing rubber or rubber-like materials is a resorcinol-formaldehyde resin with elastomeric latex. The resorcinol-formaldehyde resin is generally applied to glass fiber material prior to molding of the reinforced article by contacting a glass fabric with an aqueous latex mixture having the resin dispersed therein. Largely because of its high cost, a satisfactory substitute for all or part of the resorcinol-formaldehyde resin has long been sought. Additionally, the resorcinol-formaldehyde resin latex mixture is difficult to apply to glass fabric in a manner whereby the resin may thoroughly impregnate and to coat the glass fibers forming the fabric. Therefore, uncoated glass fiber strands often times remain in the fabric after being contacted with the resinous mixture. These strands are subject to glass-on-glass abrasion which soon destroys the long strands of glass and renders its reinforcing properties unsatisfactory.

It has been proposed that glass fiber materials be coated, while being formed, with a rubber adhesive in order to insure complete coating of the glass fiber with coating materials. For example, a glass fiber strand composed of a multitude of individual fine glass fibers or filaments formed by being drawn from a molten cone of glass located at the tips of small orifices in a bushing such as shown in U.S. Pat. No. 2,133,238, are subjected to a bath containing the adhesive material. However, difficulty has been encountered in coating glass fibers in this manner because the adhesive resorcinol-formaldehyde resin latex mixture remains tacky after application and drying and interferes with subsequent twisting, winding and spinning operations performed on the glass fibers to form roving, yarn, fabric, and the like.

In a typical two-step operation, glass fibers formed as described above, are coated while moving at a high speed with a sizing composition containing a glass binder and lubricant to yield a strand comprising a multitude of individual glass filaments having sufficient integrity for workability and formation into yarn or the like. After the size has been applied to the glass, a number of strands in parallel form are coated with a coating composition, dried and then wound on a tubular support to form glass fiber roving which may then be formed by twisting, spinning, or weaving, into yarn fabric or other forms suitable for use as a reinforcement for elastomeric products. It has been found that the addition of conventional adhesive, i.e., with resorcinol-formaldehyde resin, to ordinary sizing compositions has not been entirely satisfactory. The resin has proven, at times, to be incompatible with the conventional sizes and interfers with their application to the glass fibers. By "sizing composition" as opposed to "a coating composition" is intended a composition for coating glass fibers useful for reinforcing rubber and rubber-like materials which does not include a rubber adhesive, such as resorcinol-formaldehyde latex mixture, or an adhesive mixture with furfuryl alcohol. By way of characterizing the sizing treatment, the weight gain of glass fiber material when subjected to a sizing treatment, comprises about ½ to 2 per cent based upon dry glass as opposed to a weight gain of about 15–30 per cent based upon dry glass in a coating application wherein a rubber adhesive is applied to the glass fiber material.

The sizing composition, or size, is usually an aqueous dispersion including, in addition to a lubricant, a coupling agent or finish material. The coupling agent or finish renders the surface of the glass fibers compatible with the resin with which they are to be employed in preparing a glass fiber reinforced elastomeric products and aids in bonding the fibers thereto.

A copending application entitled "FIBER FORMING AND COATING PROCESS", filed on April 9, 1969, by Warren W. Drummond and Donald W. Denniston, Ser. No. 814,731, now abandoned and assigned to the assignee of this invention discloses apparatus for applying a combined sizing and coating composition to individual glass fibers and then drying the fibers in strands and collecting the dried strands on a forming tube. By this process, the glass fibers are simultaneously coated with both the sizing and the coating in a single coating step that reduces substantially the time and equipment required to process the glass fibers for use as a reinforcement in elastomeric products. The combined sizing and coating compositions previously employed with this process included only resorcinol-formaldehyde as the resin constituent. There is a need, therefore, for a sizing, coating and a combined sizing and coating composition that may be more economically prepared and applied to the glass fibers.

SUMMARY OF THE INVENTION

This invention provides novel coating compositions for preparing glass fibers in use in reinforcing elastomeric products in a manner more economical than heretofore known. The invention provides novel sizing compositions for glass fibers permitting of improved impregnation of a glass fiber strand composed of a multiplicity of individual glass filaments with rubber adhesive. Additionally, there are provided combined sizing and coating compositions for glass fibers enabling the application of sizing and adhesive chemicals to a glass fiber strand in a single step application.

The invention provides a sizing, coating and a combined sizing and coating composition for glass fibers for use in reinforcing elastomeric products wherein furfuryl alcohol is a constituent. A typical combined sizing and coating composition comprises an aqueous mixture of furfuryl alcohol, synthetic rubber latices such as neoprene, isoprene, butyl rubber, butadiene-styrene, acrylonitrile-butadiene-styrene copolymers, styrene-butadiene-vinylpyridine copolymers and the like, and a coupling agent such as gamma-aminopropyl triethoxysilane and a resorcinol-formaldehyde resin. The rubber adhesive portion of the combined sizing and coating compositions comprises generally furfuryl alcohol and a resorcinol-formaldehyde resin which may be employed in admixture with the remaining ingredients and form a combined sizing and coating composition for both sizing and coating glass fibers in a single application as the glass fibers are formed and drawn. Alternatively, the rubber adhesive portion, together with the latex portion, may be applied to a previously sized glass fiber in the form of strands and yarns in a subsequent application step. In this process, it is preferred that a small amount of furfuryl alcohol be incorporated into the sizing composition to aid in impregnation of the glass fiber material with rubber adhesive. Preferably, the coupling agent is an aminosilane type coupling agent having the general formula:

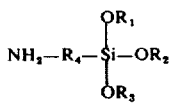

wherein $R_1$, $R_2$, and $R_3$ are the same or different and are selected from lower alkyl or aliphatic hydrocarbons having less than eight and more preferably, less than five carbon atoms. $R_4$ is a biradical selected from the lower alkyl or aliphatic hydrocarbons having less than 8 carbon atoms. Combined sizing and coating weight gains of about 15–40 per cent are possible.

Other advantages and details of the invention will become apparent by reference to the following examples and more detailed description thereof.

BRIEF DESCRIPTION OF THE DRAWINGS

FIG. 2 is an enlarged view of the fiber forming and coating portion of the operation illustrated in FIG. 1.

FIG. 3 is a side view of FIG. 2 illustrating the arrangement of the glass fibers as they pass through the forming and coating portion of the operation illustrated in FIG. 1.

DESCRIPTION OF THE PREFERRED EMBODIMENT

Figure 1:
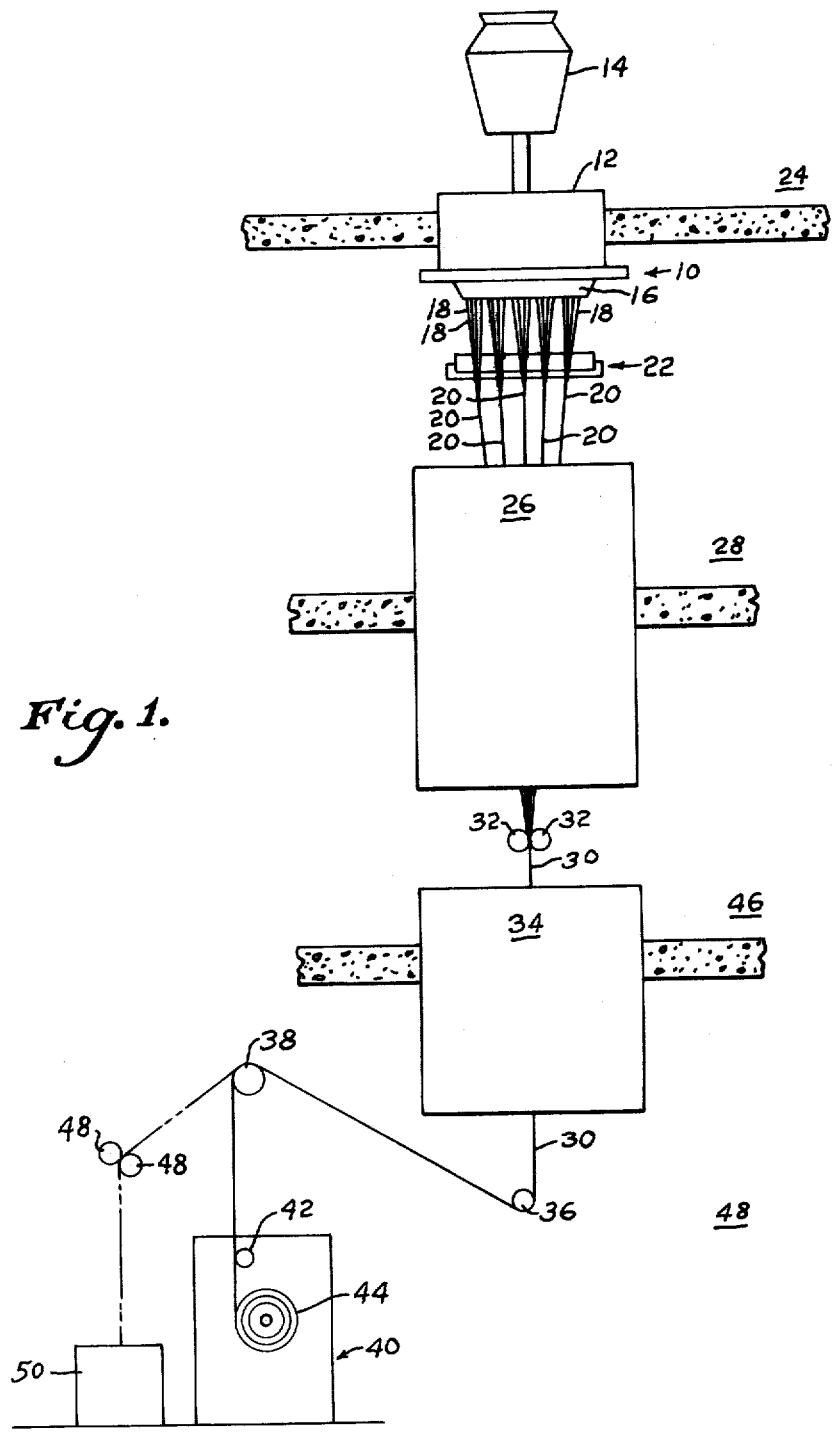
FIG. 1 is a diagrammatic view in elevation of a glass fiber strand forming, coating and drying operation.

Referring to the drawings and particularly to FIG. 1, there is illustrated diagrammatically fiber forming and coating apparatus with the fiber forming apparatus generally designated by the numeral 10. A premelter 12 in the fiber forming apparatus 10 is supplied with glass marbles from the supply hopper 14. Suitable controls are provided to automatically feed the glass marbles to the premelter 12 where they are melted and the molten glass flows through openings in a bushing 16 secured to the underside of the premelter 12. Glass fibers 18 are drawn or attenuated from cones of the molten glass suspended from tips in the openings in the bottom of the bushing 16. The bushing may, for example, have 40 pairs of rows with 25 tips in each pair of rows so that about 1,000 fibers can be simultaneously drawn from the tips in the bushing 16. From each of the pairs of rows about 25 fibers are gathered and form about 40 groups or strands of fibers designated by the numeral 20. The spaced strands or groups 20 pass through drying ovens as later described. Because the fibers 18 are drawn from the fiber forming apparatus, the hopper 14 and premelter are preferably located at the top level in the building designated in FIG. 1 by the numeral 24.

The separate fibers 18 pass over a conventional roller type coating applicator generally designated by numeral 22 that is positioned adjacent to the bushing 16 and is arranged to coat the individual fibers 18 with the later described combined sizing and coating composition. The individual fibers 18 after being coated with the combined sizing and coating composition are gathered into groups or strands 20 containing about 25 glass fibers 18. The strands 20 of the coated fibers are thereafter drawn downwardly through a first heating zone or oven 26 which may be a dielectric oven. The groups or strands 20, while separated from each other as illustrated in the drawings, are dried in the first heating zone 26 to remove the water and volatilize the ammonia in the combined sizing and coating composition on the fibers 18. The groups or strands 20 of fibers 18 are spaced from each other approximately one-half inch as they are drawn into the oven 26. The strands 20 remain spaced from each other in the oven 26 while the strands are being dried. The strands 20, while being drawn through the oven 26 located at a second level 28 immediately below the top level 24, converge toward each other and are joined into a single or composite strand 30 as they pass over a pair of graphite gathering shoes 32.

The single composite strand 30 is then drawn through a second heating zone or oven 34 where additional heat is applied to the coated fibers to further cure the coating so that the combined strand 30 forms a roving. The combined strand or roving 30 passes over suitable guides 36 and 38 to a glass fiber strand forming winder 40 such as that illustrated in U.S. Pat. No. 3,041,662; 3,151,963 and 3,256,079. The forming winder 40 has a traverse 42 that forms a generally cylindrical package 44 on the winder 40 with an open wind.

Alternately, the separate strands 20 of fibers 18 can be joined into a combined strand or roving 30 after passing through the oven 26 without further curing of the coating or the cured combined strand may be chopped into short discontinuous strands before the strand is wound on the forming winder 40.

As illustrated in FIG. 1, the lower portion of the oven 26, the graphite gathering shoes 32 and a portion of the second oven 34 are located at a still lower level 46. The demarcation between the various levels is indicated by the concrete floors. The lower portion of the oven 34 and the strand forming winder 40 are located at the lower level 48. The strand travel direction may be changed from the vertical direction illustrated to a horizontal direction prior to entry into the second heating zone 34 to again reduce the height of the building required to house the strand forming and coating apparatus.

It is preferred that the combined strand 30 be pulled continuously during changing of the packages 44 on the winder 40 in order to avoid rethreading the separate strands 20 and combined strand 30 through the oven 26. Thus, pulling wheels 48 are provided on one side of the winder 40 and are employed to direct the combined strand or roving 30 into a waste container

50.

Referring to FIGS. 2 and 3, the upper portion of the fiber forming and coating apparatus is illustrated in enlarged form. In FIGS. 2 and 3, the individual fibers 18 are formed into small inverted pyramid-shaped groups, generally designated by the numeral 52 that contain between 10 and 50 fibers. In the groups, the fibers 18 are arranged in spaced side-by-side relation. The individual fibers 18 pass over a roller 54 of the roller type applicator 22. The roller 54 is suitably supported on a support member 56 that has a reservoir containing a supply of the combined sizing and coating composition. As the individual fibers are drawn over the surface of the roller 54, the fibers 18 tend to first move together in a ribbon and then fold over each other as they separate from the surface of the coated roller 54. A layer of the combined sizing and coating composition designated by the numeral 58 is picked up by the individual fibers 18 from the roller 54 and the combined sizing and coating composition tends to adhere to the fibers and the fibers 18 tend to hold together into unitary group or strand 20 that has an oval shape in cross section. The groups or strands 20 present a much greater surface area for drying the coated glass fibers 18 within the strands 20 in oven 26 than if the fibers 18 and strands 20 were consolidated into the composite strand 30 before drying. With this arrangement, the drying rate for the separate strands 20 proceeds at a faster rate in a smaller oven than the drying of a composite strand similar to the strand 30.

In a copending application Ser. No. 93,937, filed Dec. 1, 1970, entitled "COATING AND COMBINED SIZING AND COATING COMPOSITION FOR GLASS FIBERS," there is disclosed and claimed coating and combined sizing and coating compositions that include a zinc salt complexed with ammonia as a constituent and substitute for a portion of the resorcinol-formaldehyde resin. It has been found that it is possible to include in the same coating or combined sizing and coating composition, both the complexed zinc salt and the furfuryl alcohol. The above cited copending application is incorporated by reference.

The following examples are illustrative of compositions according to the invention. All parts indicated therein are parts by weight unless stated otherwise.

Several of the following examples are illustrative of a combined sizing and coating composition according to the invention which may be used in the previously described single-step process for applying both the sizing and coating ingredients to glass fiber materials for preparing the glass fibers for reinforcing elastomeric materials. In application, glass fibers may be contacted with the combined sizing and coating composition as they are formed, preferably the glass fibers are contacted with the composition within a few feet of the bushing and cone from which they are being drawn as previously described in reference to FIGS. 1–3. The combined sizing and coating composition described hereinafter and other compositions of the invention may be applied by a conventional roller applicator such as described in U.S. Pat. No. 2,873,718.

A suitable formulation for the combined sizing and coating composition may be prepared containing the following ranges of constituents.

| Constituent | % By Weight | |
|---|---|---|
| Resorcinol-formaldehyde resin | 1.5–15 | |
| Natural or synthetic rubber latex or mixtures thereof | 20–70 | |
| Furfuryl alcohol | 0.01–10 | |
| Coupling Agent | 0–3 | coating solution |
|  | 0.1–3 | combined sizing and coating |
| Ammonia (28% NH$_4$OH) | 0–10 | |
| Water | 60–85 | |
| Other materials (lubricants, wetting agents, antifoam agents and stabilizers) | 0–5 | |

Resorcinol-formaldehyde resin may be present in amounts as low as 1% but tackiness is encountered with increasing severity corresponding to decreasing resorcinol-formaldehyde resin below about 1.8%. This tackiness may be compensated by addition of limited amounts of a zinc salt up to about 5%.

EXAMPLE I

Combined Sizing and Coating Composition

To an open vessel was charged under mild agitation, 3,600 parts water, 16 parts gamma-aminopropyltriethoxysilane coupling agent and 400 parts anhydrous ammonia. The aqueous solution was gently stirred and thereafter there was added thereto, 400 parts furfuryl alcohol 16 parts zinc sulphate (ZnSO$_4$), and 3,200 parts of a synthetic rubber latex sold by General Tire and Rubber Company under the trade name "GenTac". GenTac is a (15:70:15) styrene-butadiene-vinyl-pyridine terpolymer (41% solids). The entire mixture was mildly agitated to maintain the latex dispersed evenly throughout the mix.

It was noted that glass fibers contacted with the foregoing composition exhibited good handling characteristics and were able to be wound or twisted into strands and rovings without the difficulty attained in the use of conventional adhesive compositions. Moreover, glass fiber materials coated with the above composition exhibited a weight gain of about 15–20 per cent by weight based on dry glass and exhibited excellent adhesion to rubber stock. Rubber stock reinforced with glass fiber materials so coated exhibited excellent tensile strengths. It was also noted that the coating and sizing composition prepared in the example showed good compatibility with little or no settling out of chemicals from the aqueous mixture.

Similar results may be obtained when styrene-butadiene-vinyl pyridine synthetic rubber latex is replaced in part or entirely with other synthetic or natural rubber latices such as neoprene, isoprene, butyl rubber, butadiene-styrene copolymers, acrylonitrile-butadiene-styrene terpolymers, and the like. Additionally, similar compositions (see Example III) may be prepared without zinc sulphate, the use of which in a coating and a combined sizing and coating composition is the subject of my copending application Ser. No. 93,937, entitled "COATING AND COMBINED SIZING AND COATING COMPOSITION FOR GLASS FIBERS," filed Dec. 1, 1970 and assigned to the assignee of this invention now abandoned.

EXAMPLE II

Combined Sizing and Coating Composition

This example, like Example I, illustrates a combined sizing and coating composition suitable for preparing glass fibers for use in reinforcing rubber or rubber-like materials or elastomeric materials in which the sizing and coating ingredients are mixed together and applied to glass fiber material in a one-step application.

Where it is desired to prepare a combined sizing and coating composition having a high solids content, especially in large commercial batches, or a combined sizing and coating composition containing excess formaldehyde, a stabilizer should preferably be added to the coupling agent as described in my copending application Ser. No. 93,939 entitled "COATING COMPOSITION AND PROCESS FOR PREPARING AND APPLYING THE COATING COMPOSITION TO GLASS FIBERS," filed Dec. 1, 1970 and assigned to the assignee of the instant invention. The stabilizer will prevent precipitation of the latex in the composition.

To an open vessel was charged 5,100 parts water, 150 parts ammonia, 10 parts zinc sulphate ($ZnSO_4$) and 20 parts gamma-aminopropyltriethoxysilane. To the mixture under mild agitation was added 20 parts surfactant, 50 parts polyvinyl pyrrolidone, 400 parts furfuryl alcohol, and 3,750 parts (15:70:15) styrene-butadiene-vinylpyridine terpolymer, such as GenTac synthetic rubber latex.

Glass fibers contacted with the foregoing composition in the manner described in Example I exhibited similar handling characteristics to those treated in Example I, and again excellent adhesion and tensile properties in reinforcing elastomeric products.

EXAMPLE III

Coating Composition

This example is illustrative of a coating composition for preparing glass fibers for use in reinforcing elastomeric products where the glass fibers have been previously contacted with a sizing composition containing a lubricant and a coupling agent.

A resorcinol-formaldehyde resinous mixture was prepared as follows: To a mildly agitated flask was charged 1,200 parts water, 426 parts resorcinol, 11 parts sodium hydroxide (NaOH), and 560 parts formaldehyde. The mixture was aged 30 minutes after which there was added thereto with mild agitation, 5,000 parts water, 400 parts ammonia, 8,500 parts (15:70:15) styrene-butadiene-vinylpyridine terpolymer, such as GenTac synthetic rubber latex, and 520 parts furfuryl alcohol.

Glass fibers previously sized with a lubricant and gamma-aminopropyltriethoxysilane coupling agent were contacted with the foregoing composition by means of a conventional roller applicator. Glass fiber material so coated had a weight gain of about 15-20 per cent based on dry glass and exhibited improved handling characteristics. The strands or roving were readily wound and woven into yarn, and the like, for further use. Additionally, glass fibers so treated showed excellent adhesion and tensile strength in reinforcing elastomeric materials.

EXAMPLE IV

Sizing Composition

This example illustrates a sizing composition employing furfuryl alcohol according to the invention. It has been found that the incorporation of a quantity of furfuryl alcohol in a conventional sizing composition applied to glass fibers as they are formed in a conventional manner results in the formation of a sized glass fiber which is readily handleable, and which may be twisted into roving and woven without difficulty. Advantageously a quantity of furfuryl alcohol corresponding to about 0.5 to 5.0 percent by weight furfuryl alcohol may be employed in the sizing composition. Additionally, it has been found that glass fibers sized in that manner are more readily impregnated with resin adhesive in a subsequent coating step than are fibers sized with a sizing compostion without furfuryl alcohol. Consequently, improvements in glass protection are noted on glass fibers sized with a conventional sizing composition to which has been added a quantity of furfuryl alcohol.

To an open vessel with mild agitation was charged 600 parts water, 200 parts polyamide resin, such as that manufactured by Dupont designated Elvamide PB-3-1521, which is an emulsion of nylon 6 having between 30 and 35 per cent solids, 5 parts polyvinyl pyrrolidone, 10 parts surfactant, 20 parts furfuryl alcohol, 2.5 parts of oleic ethoxylated amide, such as Ethomid O/15 that serves as both a lubricant and surfactant, and 2.5 parts of gamma-aminopropyltriethoxysilane coupling agent.

Similar sizes for glass fibers were prepared in a similar manner and have the following compositions:

EXAMPLE V

| Sizing Composition | |
|---|---|
| Water | 400 parts |
| Blocked aromatic isocyanate in aqueous emulsion | 75 parts |
| Polyvinyl Alcohol | 5 parts |
| Polyethoxyphenol Surfactant | 2.5 parts |
| Polyvinyl Pyrrolidone | 5 parts |
| Furfuryl Alcohol | 10 parts |
| Gamma-aminopropyltriethoxysilane | 2 parts |

Nopco D-632 sold by Nopco Chemical Company is a suitable blocked aromatic isocyanate in emulsion form. Igepal CO-520 sold by General Aniline is a suitable polyethoxyalkylphenol surfactant.

EXAMPLE VI

| Sizing Composition | |
|---|---|
| Water | 340 parts |
| Styrene-butadiene rubber (carboxylated) | 110 parts |
| Fatty acid amide | 15 parts |
| Polyethoxyphenol Surfactant | 1 part |
| Ethoxylated Vegetable Oil | 2 parts |
| Furfuryl Alcohol | 15 parts |
| Polyvinyl Pyrrolidone | 15 parts |
| Gamma-aminopropyltriethoxysilane | 2 parts |

Goodrite 2570 × 23 is a suitable carboxylated SBR sold by B. F. Goodrich Company. Versamid 140 is a suitable polymerized fatty acid amide sold by General Mills. Emulphor EL-719 is a suitable ethoxylated vegetable oil sold by General Aniline.

Examples VII – XII illustrate other formulations of a combined sizing and coating composition in accordance with the invention. Examples X, XI and XII also include zinc sulphate as a constituent. Example XIII is a conventional combined sizing and coating composition that was used as a control for comparative tests and did not include either the furfuryl alcohol or the zinc sulphate.

EXAMPLE VII

| | |
|---|---|
| Water | 3,950 |
| Resorcinol | 180 |
| Sodium hydroxide (NaOH) | 2.5 |
| Formaldehyde (37% solids) | 266 |
| (15:70:15) styrene-butadiene-vinyl pyridine (GenTac, 41% solids) | 4,000 |
| Ammonium hydroxide (28%) | 190 |
| Furfuryl alcohol | 150 |
| Gamma-aminopropyltriethoxysilane | 13 |

EXAMPLE VIII

| | |
|---|---|
| Water | 4,100 |
| Ammonium hydroxide | 75 |
| Resorcinol | 30 |
| Furfuryl alcohol | 300 |
| Tetronic 704 | 100 |
| Gamma-aminopropyltriethoxysilane | 15 |
| Polyvinyl alcohol | 15 |
| (15:70:15) styrene-butadiene-vinyl pyridine (GenTac, 41% solids) | 3,000 |

Tetronic 704 is a suitable surfactant built on ethylene diamine with polyoxypropylene and polyoxyethylene groups sold by Wyandotte Chemical Company. Gelvatol is a suitable polyvinyl alcohol sold by Monsanto.

EXAMPLE IX

| | | |
|---|---|---|
| Water | 920 | parts |
| Ammonium hydroxide | 260 | parts |
| Zinc sulphate | 8 | parts |
| (15:70:15) styrene-butadiene-vinyl pyridine (GenTac, 41% solids) | 2,600 | parts |
| Gamma-aminopropyltriethoxysilane | 36 | parts |

EXAMPLE X

| | | |
|---|---|---|
| Water | 10,000 | parts |
| Ammonium hydroxide | 400 | parts |
| Zinc sulphate | 16 | parts |
| Starch | 100 | parts |
| Emery Lube 1200-36 | 50 | parts |
| Gamma-aminopropyltriethoxysilane | 36 | parts |
| Nopco NXZ | 1 | part |
| (15:70:15) styrene-butadiene-vinyl pyridine (GenTac, latex 41% solids) | 7,000 | parts |
| Furfuryl alcohol | 500 | parts |

Emery Lube 1,200-36 is a proprietary fatty acid lubricant derivative of Emery Industries. Nopco NXZ is an anti-foam agent.

EXAMPLE XI

| | | |
|---|---|---|
| Water | 4,000 | parts |
| Potassium hydroxide | 4 | parts |
| Resorcinol | 360 | parts |
| Formaldehyde (37% solids) | 500 | parts |
| (15:70:15) styrene-butadiene-vinyl pyridine (GenTac, 41% solids) | 8,800 | parts |
| Ammonium hydroxide | 350 | parts |
| Water | 2,500 | parts |
| Ammonium hydroxide | 120 | |
| Zinc sulphate | 8 | parts |
| Furfuryl alcohol | 200 | parts |
| Casein | .5 | parts |
| Gamma-aminopropyltriethoxysilane | 30 | parts |

The casein is a milk protein that acts as a stabilizer.

EXAMPLE XII

| | | |
|---|---|---|
| Water | 4,000 | parts |
| Ammonium hydroxide | 200 | parts |
| Zinc sulphate | 8 | parts |
| Polyvinyl alcohol | 40 | parts |
| Furfuryl alcohol | 400 | parts |
| Octylsuccinate wetting agent | 1 | part |
| Tetronic 704 | 50 | parts |
| Gamma-aminopropyltriethoxysilane | 30 | parts |
| (15:70:15) styrene-butadiene-vinyl pyridine (GenTac, 41% solids) | 2,800 | parts |
| Nopco NXZ | .5 | parts |

Nopco 1186A is a suitable octylsuccinate wetting agent and Nopco NXZ is an anti-foam agent of water dispersable polyoxypropylene. Both are sold by Nopco Chemical Company.

EXAMPLE XIII

Control

| | | |
|---|---|---|
| Water | 3,950 | parts |
| Resorcinol | 180 | parts |
| Sodium hydroxide | 1.5 | parts |
| Formaldehyde (37% solids) | 266 | parts |
| (15:70:15) styrene-butadiene-vinyl pyridine (GenTac, 41% solids) | 4,000 | parts |
| Ammonium hydroxide | 190 | parts |
| Gamma-aminopropyltriethoxysilane | 36 | parts |

All the sized and coated glass fibers of these examples are tested according to the following procedures.

Tensile strength of glass fiber cord is determined by use of an Instron test device. A cord to be tested is mounted on the clamps or jaws of an Instron test device so that the gage length or distance between the points of tangency of the cord and the clamping blocks is ten inches. The Instron device is operated at 2 inches/minute crosshead speed until the specimen cord breaks. The load and elongation at cord failure are recorded for a sample of $n$ cords, with n usually equal to 10. The per cent elongation of each cord is determined as:

$$\% \text{ elongation} = \frac{\text{inches elongated}}{10} \times 100.$$

Per cent elongation is determined for each cord at 20 and 50 per cent of the load at cord failure. Breaks within one-fourth inch of the clamps are considered "jaws-breaks" due to damage in clamping and the results discarded. Average breaking strenght and elongation are determined for ($n$ — jaw-breaks) samples.

Tensile strength of rubber coated glass fiber cord embedded in rubber is determined using samples prepared each with three parallel cords embedded between two 50-55 mil thick layers of common rubber stock (as Firestone No. 8634). Samples are prepared by placing the fibers between rubber sheets, placing them in a preheated press at about 300°F, pressing at about 7.1 tons for about 25 minutes cure time, quick chilling and cutting off trim.

An Instron test device is used as for cord tensile strength determinations. A gage length of 7 to 7½ inches is used and a crosshead speed of two inches per minute is established until the test specimen ruptures. Strength or load at rupture is determined but normally elongation is not. Again a number of specimens are tested and the results averaged.

Strip adhesion for rubber coated glass fiber cord is determined by the following method. Three sheets of 50–55 mil rubber stock approximately 8¼ × 11 inches are placed in a mold. A 2½ inch wide strip of Holland cloth is placed at each end of the rubber slab over the top rubber sheet. Glass fiber cord to be tested is placed over the rubber and additional strips of Holland cloth are placed over the cord at each end. Three similar rubber sheets are placed over the cord and the entire combination is pressed in the mold at about 100 pounds per square inch for about 25 minutes at about 300°F to cure the rubber. The rubber-cord laminate is removed from the mold and allowed to slowly (overnight) cool to room temperature.

The Holland cloth is removed separating the ends of the laminate test specimen. After setting an Instron test device for a gage length of one-half to three-fourths inch and calibrating the unit for a crosshead speed for 2 inches per minute, the bottom layer of rubber and the cord are placed in the top jaw and the top layer of rubber in the bottom jaw of the test device. The Instron test device is operated until a separation of two inches is obtained and the loading noted. The top layer of rubber is then inserted in the top jaw and the cord in the bottom jaw with a gage length of one-half to three-fourths inch. The Instron device is again operated until a separation of two inches is obtained and the loading noted. The test is repeated for the opposite end of the specimen and for additional specimens included in the sample. The results of the tests are averaged for the adhesion of the cord to rubber.

Typical commercial rubber compounds containing principally styrene butadiene rubber and selected to have the following properties are used to test glass fiber properties: Optimum cure at 300°F, about 30 minutes; 300 per cent modulus, about 1,900 pounds/square inch; tensile strength; about 2900 pounds/square inch; elongation at failure, about 430 per cent; hardness, about 64; and specific gravity about 1.13.

The following table clearly illustrates that the combined sizing and coating compositions of Examples VI-XII inclusive, containing the furfuryl alcohol as a constituent have superior tensile or adhesion properties when compared with a conventional combined sizing and coating composition used as a control that does not include furfuryl alcohol as a constituent.

obtained. The elastomeric materials to which the coated strands can be added as a reinforcement include natural rubbers or rubbers formed synthetically of butadiene, chloroprene, and the like or copolymers of butadiene, chloroprene, isoprene with other materials well known in the manufacture of synthetic rubbers and especially the vulcanizable and curable modifications of the above. The term "elastomer" or "elastomeric" or "rubber or rubber-like material" is intended, therefore, to include both the natural and synthetic rubber in an uncured or unvulcanized state as well as the cured or vulcanized state.

The invention has been described with respect to details of the preferred sizing, coating and combined sizing and coating composition and the best mode of operation contemplated by the inventor. Other formulations of the coating composition and the combined sizing and coating compositions are contemplated which should be obvious in light of the previous description. It is to be understood that the invention is not necessarily limited to the precise formulations and methods described herein.

I claim:

1. In an aqueous coating composition for coating glass fibers consisting essentially of:
   20 to 70 percent by weight of a latex selected from the group consisting of natural rubber latex, neoprene latex, isoprene latex, butyl rubber latex, butadiene-sytrene copolymer latex, acrylonitrite-butadienestyrene copolymer latex, styrene-butadiene-vinylpyridine copolymer latex, and mixtures thereof, and a rubber adhesive comprising a resorcinol formaldehyde resin, with the remainder of said coating composition being water; the improvement comprising; as
   said rubber adhesive, a composition consisting essentially of 0.01 to 10 percent by weight of the coating composition of furfuryl alcohol, and 1 to 15 percent by weight of the coating composition of said resorcinol formaldehyde resin.

2. The coating composition of claim 1 having therein up to 3 percent by weight of an amino silane coupling agent represented by the structural formula:

TABLE I

| Example | Number of Filaments Per Strand | Direct Coat Dip Pick-Up Weight % Bare Glass | Resorcinol Formaldehyde Latex Overcoat Weight % Bare Glass | Tensile Pounds Pull | | Adhesion Pounds Pull Room Temperature |
|---|---|---|---|---|---|---|
| | | | | In Air | In Rubber | |
| XII control | 29 | 9 | 12 | 41 | 70 | 55 |
| XII control | 29 | 9 | — | 34 | 66 | 47 |
| VII | 27 | 9 | 15 | — | 70 | 50 |
| VIII | 29 | 5 | 8 | 51 | 76 | 67 |
| IX | 29 | 8 | 13 | 52 | 70 | 76 |
| X | 29 | 8 | — | 37 | 79 | 33 |
| XI | 30 | 15 | — | 67 | — | 58 |
| XII | 29 | 7.5 | 10.6 | 52 | 80 | 74 |

The Table clearly illustrates that the strands coated with the combined sizing and coating compositions that include furfuryl alcohol as a constituent have satisfactory adhesion and satisfactory structural strength and compression fatigue resistance for glass fiber reinforced elastomeric products. Cord or fabric prepared from the coated strands was readily impregnated by additional rubber adhesive and improved properties were

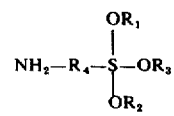

wherein $R_1$, $R_2$, $R_3$ are selected from the lower alkyl radicals having 1 to 8 carbon atoms and can be the same or different, and $R_4$ is an aliphatic biradical having 1 to 8 carbon atoms.

* * * * *